Figures 1, 2:
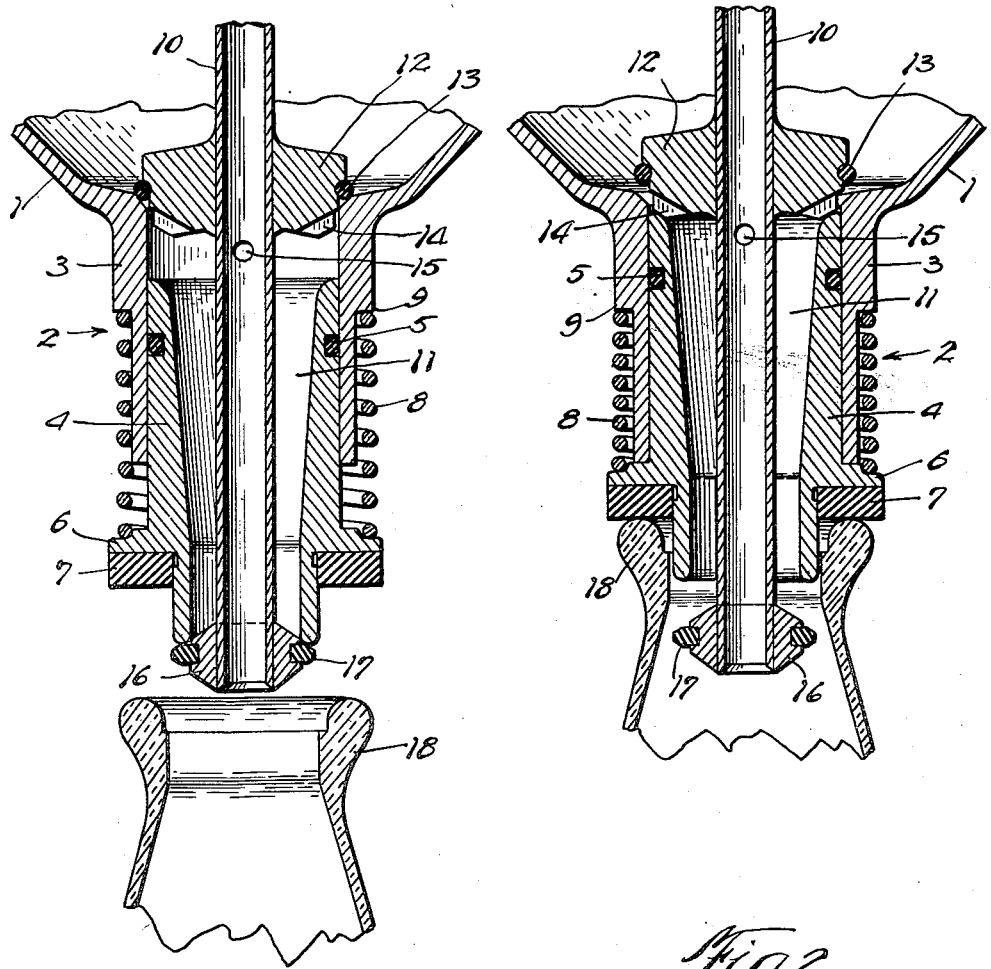

May 25, 1954  H. H. FRANZ  2,679,347
BOTTLE FILLER VALVE
Filed July 14, 1951  2 Sheets-Sheet 1

INVENTOR.
Henry H. Franz.
BY

May 25, 1954   H. H. FRANZ   2,679,347
BOTTLE FILLER VALVE
Filed July 14, 1951   2 Sheets-Sheet 2

INVENTOR.
Henry H. Franz.
BY

Patented May 25, 1954

2,679,347

UNITED STATES PATENT OFFICE 2,679,347

BOTTLE FILLER VALVE

Henry H. Franz, Baltimore, Md., assignor to The Creamery Package Mfg. Company, Chicago, Ill., a corporation of Illinois Application July 14, 1951, Serial No. 236,723

1 Claim. (Cl. 226—124)

The invention relates to valves employed in container filling apparatus, and more particularly relates to such valves in apparatus adapted to the filling of bottles with milk.

Bottle filling apparatus for handling milk usually includes a reservoir having several depending discharge or "filler" tubes. Each filler tube usually is constructed of two telescoping sections, the upper section being secured in continuously open communication with the reservoir. A closure valve, at the outlet end of the lower section, is supported by a small air vent tube extending through the filler tube and terminating above the level of milk in the reservoir. Supporting means in the reservoir normally retains the vent tube and valve in outlet closure position.

In the usual filling operation, a bottle is lifted into sealing contact with the lower section of the filler tube which is thereby raised from the closure valve, thus opening the outlet for the flow of milk from the reservoir into the bottle while the air in the bottle is expelled through the vent tube. When the bottle is full, the milk rises into the vent tube. Upon lowering the filled bottle, the descending lower tube section is seated upon the closure valve, cutting off the flow of milk from the filler tube.

With the common type of closure valve, having the vent tube passage extending through the bottom of the valve and open at all times, the small column of milk remaining in the vent tube when the filling cycle is complete is cleared from the tube. In the "gravity" type of bottle filling apparatus, in which the reservoir interior is at atmospheric pressure, the milk remaining in the vent tube drops through the lower end of the tube into the bottle immediately after the bottle is lowered from sealing contact with the filler tube. The lower extremity of the filler tube and closure valve structure extends into the bottle during the filling operation with a displacement volume below the bottle cap seat equal to the column of milk in the vent tube, and when the bottle is lowered free of the filler valve the milk dropping from the vent tube completes the filling of the bottle.

In the vacuum type of bottle filling apparatus, in which a sub-atmospheric pressure is maintained within the reservoir, the milk remaining in the vent tube is drawn through the upper end of the tube into the reservoir immediately after the bottle is lowered from sealing contact with the filler tube. In this case, the filler tube and closure valve structure does not extend into the bottle sufficiently for displacement below the cap seat and the bottle is full when it is lowered from the filler tube.

Variations in the quantity of milk remaining in the vent tube causes over-filling or under-filling of the bottles in gravity filling apparatus, and upsets the vacuum balance with attending operating difficulties in vacuum filling apparatus. Such variations mainly occur with changes in the level of the milk in the reservoir as effected by uneven supply, excessive foam and other operating causes.

The principal object of the present invention is to provide an improved bottle filler valve of the open vent tube type which controls to a predetermined uniform quantity the amount of milk remaining in the vent tube after filling a bottle, and which may be adapted to clear all of the milk from the vent tube, thereby enabling the filling of successive bottles to a uniform measure unaffected by variations in the level of milk in the supply reservoir, and when operating under vacuum enabling a substantial reduction in the vacuum required and in the conditions creating foam in the reservoir.

Other objects and advantages will be apparent in the following description of the preferred embodiment of the invention which is illustrated in the accompanying drawings.

Figure 3:
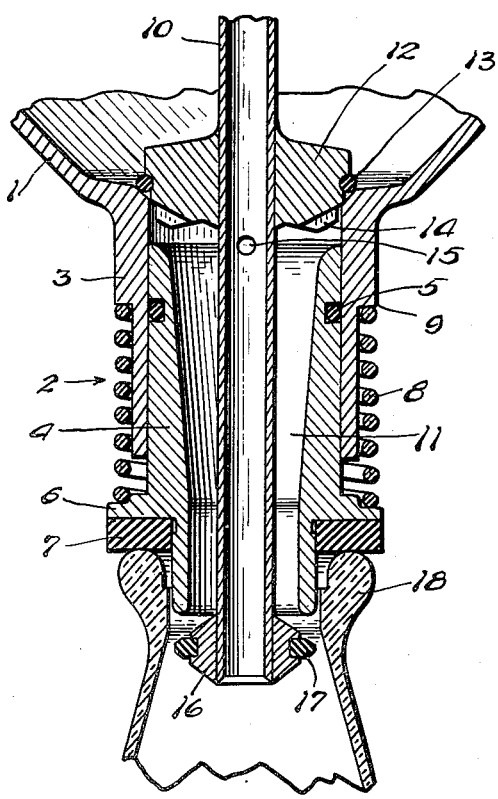
Figure 4:
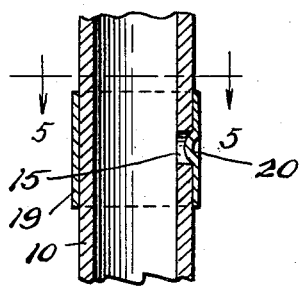
Figure 5:
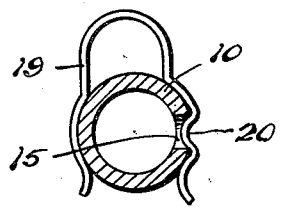
Figure 6:
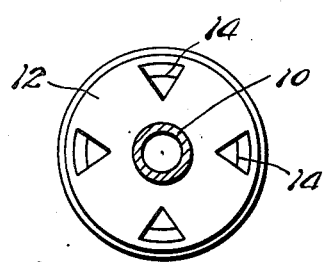

In the drawings, Fig. 1 represents a sectional view taken on a central vertical plane through the improved filler valve in closed position. Fig. 2 is a similar sectional view showing the parts of the valve in fully open position. Fig. 3 is a similar sectional view in which the parts are shown in position intermediate of the positions shown in Fig. 1 and Fig. 2. Fig. 4 is an enlarged vertical sectional view of a portion of the vent tube showing an alternative attachment. Fig. 5 is a cross sectional view of the vent tube and attachment taken on the plane of the line 5—5 in Fig. 4. Fig. 6 is a bottom view of the upper valve member shown in Figs. 1 to 3.

Referring to the drawings, the reference numeral 1 indicates a portion of the bottom wall of a milk reservoir, as commonly provided in bottle filling apparatus. Depending from the bottom wall 1 is a telescoping discharge or "filler" tube, designated generally at 2, comprising an upper section 3 and a lower section 4. The upper section 3 is rigidly secured in an opening in the reservoir bottom wall 1, the upper end of section 3 preferably being welded to the margin of the wall opening and providing a continuous structure. The lower section 4 is slidably mounted within the upper section 3 and carries a liquid sealing packing ring 5 positioned in an annular groove provided in its overlapped portion. The open lower end of the tube section 4 forms a milk discharge orifice.

An annular flange 6 is formed upon the lower portion of the tube section 4, substantially spaced from the lower end of the tube section. The flange 6 serves as an abutment for a resilient bottle contact ring 7 mounted on the lower end portion of the tube section. A coiled spring 8 is endwardly confined between the flange 6 on the lower tube section 4 and an annular shoulder 9 formed on the upper tube section 3. The spring 8 is tensioned to move the lower tube section 4 downward to the limit of movement hereinafter described.

A vent tube 10 is positioned within the filler tube 2, extending axially through the tube sections 3 and 4 and upwardly within the reservoir with its open upper end above the milk level, the open lower end of the vent tube extending outwardly of the lower end of the tube section 4. The vent tube 10 is of small diameter relative to the inner surrounding walls of the tube sections 3 and 4, the latter forming an annular chamber 11 of substantial volume which serves as a passage for the flow of milk from the reservoir to a bottle being filled, and which also functions as a pump chamber as hereinafter described.

An annular inlet valve 12 is mounted on the vent tube 10 at the opening from the reservoir into the upper end of the upper tube section 3. The inlet valve 12 controls the inflow of milk from the reservoir into the chamber 11. A resilient seal ring 13 is mounted in an annular groove formed in the lower peripheral edge of the valve 12 in position for liquid sealing contact with the upper end of tube section 3. The inlet valve 12 supports the vent tube 10 in position within the filler tube 2, and when seated prevents further downward movement of the vent tube. The under surface of the inlet valve 12 is provided with an annular series of downwardly projecting spaced lugs 14 positioned adjacent to the periphery of the valve 12 and adapted for lifting contact by the upper end of the lower tube section 4 whereby the valve 12 is lifted from its seat to permit the inflow of milk from the reservoir to the chamber 11. Alternatively, the lugs 14 may be provided on the upper end of the tube section 4 rather than on the valve 12. An opening 15 is provided in the wall of the vent tube 10 below the valve 12 which establishes communication between the interior of the vent tube and the chamber 11.

An annular outlet valve 16 is mounted on the lower end portion of the endwardly open vent tube 10 and is normally positioned in closure of the milk discharge orifice at the lower end of the tube section 4. Preferably, the valve 16 is constructed with its outer diameter slightly less than the inner diameter of the tube section 4 so that the valve may be withdrawn with the vent tube upwardly through the filler tube sections. The valve 16 carries a removable abutment ring 17 of elastic material mounted in an annular groove formed in the peripheral surface of the valve body. The ring 17 extends outward of the peripheral surface of the valve body and is normally in abutment with the end of the tube section 4. The ring 17 serves as a liquid seal in the closure of the discharge orifice by the valve 16, and also serves as a stop for limiting the downward movement of the tube section 4 as actuated by the spring 8.

In the operation of filling bottles, conventional mechanism is employed to convey a bottle, indicated in part at 18, into position beneath the closed filler valve with the mouth of the bottle in concentric alinement with the resilient contact ring 7, as illustrated in Fig. 1. Lifting mechanism raises the bottle into sealing contact with the ring 7 and further raises the bottle to lift the lower tube section 4. The vent tube 10 and the valves 12 and 16 remain stationary until the tube section 4 is near its uppermost position.

The tube section 4 first is lifted from the lower outlet valve 16 thereby opening communication between the bottle and the chamber 11 for a period before the milk inlet valve 12 is opened, as illustrated in Fig. 3. This causes the discharge into the bottle of the milk trapped in the chamber 11 at the end of the preceding bottle filling operation. Continued upward movement of the tube section 4 carries its upper end into contact with the lugs 14 and finally lifts the upper inlet valve 12 into open position, as illustrated in Fig. 2. In this position, both valves controlling the filler tube 2 are fully open and the milk flows freely from the reservoir through the chamber 11 into the bottle, the air in the bottle being expelled through the open vent tube. When the bottle is full, milk enters the vent tube and rises to the level of the milk in the reservoir. Any foam produced during the filling rises through the vent tube and the chamber 11.

A reverse movement of the lifting mechanism lowers the bottle after it is filled. As the bottle descends, the spring 8 maintains the ring 7 in sealing contact with the mouth of the bottle, and the tube section 4 is lowered with the bottle. The inlet valve 12, supporting the vent tube 10 and resting upon the upper end of the tube section 4, is lowered with the tube section 4 until the seal ring 13 is seated upon the upper end of the upper tube section 3, whereupon the inlet opening to chamber 11 is closed against further flow of milk from the reservoir and the vent tube 10 is supported at its limit of descent.

With the further lowering of the bottle, the descending lower section 4 functions as a pump piston and draws milk into the lengthening chamber 11, through the opening 15 in the vent tube and through the open lower end of the tube section 4, in quantity sufficient to lower the level of the column of milk in the vent tube to the level of the opening 15. Upon uncovering the opening 15, air from the empty upper portion of the vent tube 10 is admitted through the opening 15 to the chamber 11, thereby preventing further withdrawal of milk from the vent tube through the lower end of tube section 4. When the tube section 4 is lowered into closure contact with the outlet valve 16 and seal ring 17, the milk within the chamber 11 is trapped therein for release into the next bottle to be filled, and there remains in the vent tube only the predetermined quantity of milk between the opening 15 and the lower end of the vent tube.

The inner dimensions of tube sections 3 and 4 are so proportioned that the volumetric displacement in the chamber 11 by the piston like stroke of the tube section 4 exceeds the volume of milk in the vent tube 10 above the opening 15 at the maximum level of milk in the reservoir. In consequence, all of the milk in the vent tube above the opening 15 is withdrawn from the vent tube on the down stroke of the tube section 4, at whatever level the milk in the reservoir may be, and leaving in the vent tube below the opening 15 just that quantity of milk necessary, in gravity filling, to finally fill the bottle. The opening 15 being below the bottom wall of the reservoir, the column of milk remaining in the vent tube is maintained in full quantity while the reservoir is being emptied at the end of an operating run.

In gravity filling apparatus the remaining column of milk in the vent tube is in such volumetric relation to the displacement within the bottle of the lower end portion of tube section 4 and outlet valve 16, that when the bottle is finally lowered free of the filler tube 2, the milk in the vent tube drops into the bottle and completes the filling operation to a uniformly maintained level of milk slightly below the bottle cap seat. This volumetric relation may be adjusted for different shapes of bottles by varying the thickness of the bottle contact ring 7.

In vacuum filling apparatus, the relatively small quantity of milk in the vent tube is lifted into the reservoir with a minimum of splash and foam when the bottle is lowered from the filler tube. By using a thick contact ring 7, the displacement by the lower tube section end and the outlet valve is reduced so that the milk in the bottle levels off slightly below the cap seat without additional milk from the vent tube when the bottle is lowered free of the valve.

A substantial reduction is accomplished in the vacuum required to be maintained in the reservoir in order to prevent unchecked waste of milk when a broken bottle is presented to the filler valve. Immediately upon opening the outlet valve 16 the milk trapped in the chamber 11 is discharged from the chamber before the inlet valve is opened. With the empty chamber 11 open to the atmosphere through the broken bottle, the head of milk to be overcome by the vacuum to prevent outflow of milk from the reservoir when the inlet valve 12 is opened, is equal only to the depth of milk in the reservoir above the valve 12. This is a reduction of several inches as compared with the conventional bottle filler valve continuously open to the reservoir wherein the effective milk head to be overcome by vacuum extends to the bottom end of the valve.

In installations where the hazard of broken bottles is minimized by adequate inspection, the vacuum maintained in the reservoir may be further reduced to that necessary only to lift the short column of milk in the vent tube. In case of a failure of the vacuum producing means, the filling operation may be continued by gravity simply by replacing the contact rings 7 by the thinner gravity filling rings. The interchangeable contact rings enable the quick change from either type of filling operation to the other.

In bottling some of the more viscous milk products, such as buttermilk, any by-passing of the product from the chamber 11 into the vent tube through the opening 15, interferes with the free exit of air from the bottle and slows the filling operation. For such a case, a spring clip 19 (Figs. 4 and 5) is provided to be slipped over the vent tube 10 and opening 15, the clip having an indentation 20 formed therein which fits into the opening 15 and secures the clip in position for closure of that opening. With the opening 15 thus closed, the downward suction stroke of the tube section 4 draws the product from the lower end of the vent tube, around the outlet valve 16 and up through the discharge orifice of the tube section 4 into the chamber 11. Otherwise, the filler valve operates as previously described. Also, it is advantageous under some conditions to omit the opening 15 from the vent tube and to increase the dimensions of the tube sections 3 and 4 so that the chamber 11 is enlarged in capacity sufficiently to receive all of the contents of the vent tube as withdrawn by the down stroke of tube section 4 and thus clear the vent tube completely.

I claim as my invention:

A bottle filler valve comprising a filler tube having upper and lower sections in telescoping relation and defining an internal chamber variable in volume by the relative movement of said telescoping sections, the upper end of said upper section being adapted for attachment in communication with a liquid reservoir, the lower end of said section forming a liquid discharge orifice, a vent tube extending through said filler tube sections in spaced relation thereto, the upper portion of said vent tube extending into said reservoir with its open upper end positioned above the level of the liquid in said reservoir, the lower portion of said vent tube having its open lower end positioned outwardly of said discharge orifice, an inlet valve secured to and supporting said vent tube, said inlet valve normally being seated in closure of the upper end of said upper section and thereby limiting the downward movement of said vent tube, said vent tube having a lateral opening positioned below said inlet valve and establishing communication between the interior of said vent tube and said chamber, spring means tending to move said lower section downwardly, an abutment carried by said lower section adapted for contact by a bottle being elevated into position for filling, the elevation of said bottle effecting the lifting of said lower section, means whereby said inlet valve is raised into open position when said lower section is lifted into uppermost position, and an outlet valve secured upon said vent tube adjacent its lower end and normally being positioned in closure of said discharge orifice when said lower section is in lowermost position, said outlet valve having an abutment limiting the downward movement of said lower section, said filler tube sections being dimensioned to provide variable volume capacity in said internal chamber between said inlet valve and said discharge orifice whereby the increase in said volume from the minimum determined by the uppermost position of said lower section to the maximum determined by the lowermost position of said lower section, is in excess of the inner volume of said vent tube between said lateral opening into said chamber and the liquid level in said reservoir.

References Cited in the file of this patent

UNITED STATES PATENTS

| Number | Name | Date |
|---|---|---|
| 1,554,805 | Fullips | Sept. 22, 1925 |
| 2,197,588 | Namur | Apr. 16, 1940 |
| 2,501,764 | Duer | Mar. 28, 1950 |